US012632275B2

(12) United States Patent
Tsirkin

(10) Patent No.: US 12,632,275 B2
(45) Date of Patent: May 19, 2026

(54) FAIR AND EFFICIENT GUEST TO HYPERVISOR VIRTUAL MACHINE SOCKET PROTOCOL

(71) Applicant: Red Hat, Inc., Raleigh, NC (US)

(72) Inventor: Michael Tsirkin, Yokneam Illit (IL)

(73) Assignee: Red Hat, Inc., Raleigh, NC (US)

( * ) Notice: Subject to any disclaimer, the term of this patent is extended or adjusted under 35 U.S.C. 154(b) by 853 days.

(21) Appl. No.: 17/851,442

(22) Filed: Jun. 28, 2022

(65) Prior Publication Data

US 2023/0418641 A1     Dec. 28, 2023

(51) Int. Cl.
*G06F 9/455* (2018.01)
*G06F 9/50* (2006.01)

(52) U.S. Cl.
CPC ...... *G06F 9/45545* (2013.01); *G06F 9/45558* (2013.01); *G06F 9/5077* (2013.01); *G06F 2009/45583* (2013.01)

(58) Field of Classification Search
CPC ............ G06F 9/45545; G06F 9/45558; G06F 9/5077; G06F 2009/45583
USPC .......................................................... 718/1
See application file for complete search history.

(56) References Cited

U.S. PATENT DOCUMENTS

| | | | | |
|---|---|---|---|---|
| 8,429,276 | B1 * | 4/2013 | Kumar | ................. G06F 9/5077 718/1 |
| 9,191,454 | B2 | 11/2015 | Fries | |
| 9,882,855 | B1 * | 1/2018 | Twitchell | ................ H04L 51/23 |
| 10,268,597 | B2 | 4/2019 | Wibling | |
| 10,664,301 | B2 | 5/2020 | Tsirkin | |
| 10,701,009 | B1 * | 6/2020 | Li | ............................ H04L 51/48 |
| 10,846,117 | B1 | 11/2020 | Steinberg | |
| 11,567,883 | B2 * | 1/2023 | Veluswamy | .......... G06F 9/5016 |
| 2013/0132058 | A1 * | 5/2013 | Butler | ..................... G06F 17/00 703/21 |
| 2015/0355892 | A1 * | 12/2015 | Glikson | ................. G06F 9/546 718/1 |
| 2017/0237822 | A1 * | 8/2017 | Kahn | ................... H04L 67/561 709/206 |

(Continued)

OTHER PUBLICATIONS

Ren, Shared-Memory Optimizations for Inter Virtual Machine Communication, 2013.

(Continued)

*Primary Examiner* — Pierre Vital
*Assistant Examiner* — Daniel Trainor
(74) *Attorney, Agent, or Firm* — Kilpatrick Townsend & Stockton LLP

(57) ABSTRACT

A fair and efficient guest to hypervisor virtual machine socket protocol may be provided by: in response to a host determining to reject a message received from a guest that was previously accepted for processing by the host, transmitting a rejection to the guest; in response to receiving, at the guest, the rejection, adding the message to a processing request queue on the guest; in response to determining that resources to handle the message have become available for the guest, transmitting an indication to the guest that the host is able to reaccept the message; in response to receiving, at the guest, the indication, retransmitting the message to the host according to the processing request queue; and in response to receiving the message from the guest a second time, accepting the message in an execution queue in a virtual memory of the host.

18 Claims, 4 Drawing Sheets

(56)  References Cited

U.S. PATENT DOCUMENTS

| | | | | | |
|---|---|---|---|---|---|
| 2017/0344292 | A1* | 11/2017 | Sterin | ................... | G06F 3/0605 |
| 2019/0068752 | A1* | 2/2019 | Brooks | ................. | G06F 9/5027 |
| 2021/0124602 | A1* | 4/2021 | Tsirkin | ................. | G06F 9/5077 |
| 2022/0188271 | A1* | 6/2022 | Mutha | ................. | G06Q 10/101 |

OTHER PUBLICATIONS

Diakhate, Efficient Shared Memory Message Passing for Inter-VM Communications, 2008.
Eiraku, Fast Networking with Socket-Outsourcing in Hosted Virtual Machine Environments, Proceedings of the 2009 ACM Symposium on Applied Computing (SAC), 2009.
Vmware, vSockets Programming Guide, 2008.

* cited by examiner

100

200

Determine to Reject Message from Guest — 210

Transmit Rejection to Guest — 220

Determine that Resource Have Become Available — 230

Transmit Indication to Guest that Host Able to Reaccept Message — 240

Receive Message from Guest — 250

Accept Message into Execution Queue — 260

FAIR AND EFFICIENT GUEST TO HYPERVISOR VIRTUAL MACHINE SOCKET PROTOCOL

BACKGROUND

Virtual socket devices provide an efficient way for Virtual Machine (VM) guests to communicate to hypervisors via a reliable channel to deliver messages between the two. Sending data from the guest to the hypervisor works simply by guest storing the data address in the channel, and hypervisor then storing it (either the data or the address) in hypervisor memory, later copying it into hypervisor application memory. Because the channel is reliable, no re-transmission timers are necessary, making the guest implementation easy (e.g., pass a message to the hypervisor and forget about it). However, simplicity means that hypervisor is not allowed to drop messages, and which poses a problem if the guests send too many messages or the messages otherwise take up more than an expected amount of the memory of the hypervisor because dropping messages would result in an unexpected loss of data.

SUMMARY

The present disclosure provides new and innovative extensions of the virtual socket to allow the hypervisor to reject incoming messages or otherwise return messages previously accepted when memory conditions at the hypervisor have changed. These extensions improve the memory efficiency and operational speed of the computing devices providing a virtualized computing environment, among other benefits.

In some examples, a fair and efficient guest to hypervisor virtual machine socket protocol is provided as a method, a system including a processor and a memory, or a computer-readable storage device including processor executable instruction to perform operations, comprising: in response to receiving, at a guest from a host, a rejection of a message previously accepted by the host from the guest for processing, adding the message to a processing request queue on the guest; and in response to receiving, at the guest from the host, an indication that the host has resources available to handle the message, retransmitting the message to the host according to the processing request queue.

In some examples, a fair and efficient guest to hypervisor virtual machine socket protocol is provided as a method, a system including a processor and a memory, or a computer-readable storage device including processor executable instruction to perform operations, comprising: in response to a host determining to reject a message received from a guest that was previously accepted for processing by the host, transmitting a rejection to the guest; after transmitting the rejection and in response to determining that resources to handle the message previously rejected by the host have become available for the guest, transmitting an indication to the guest that the host is able to reaccept the message; and in response to receiving the message from the guest a second time, accepting the message in an execution queue in a virtual memory of the host on behalf of the guest.

In some examples, a fair and efficient guest to hypervisor virtual machine socket protocol is provided as a method, a system including a processor and a memory, or a computer-readable storage device including processor executable instruction to perform operations, comprising: in response to a host determining to reject a message received from a guest that was previously accepted for processing by the host, transmitting a rejection to the guest; in response to receiving, at the guest, the rejection, adding the message to a processing request queue on the guest; in response to determining that resources to handle the message have become available for the guest, transmitting an indication to the guest that the host is able to reaccept the message; in response to receiving, at the guest, the indication, retransmitting the message to the host according to the processing request queue; and in response to receiving the message from the guest a second time, accepting the message in an execution queue in a virtual memory of the host.

Additional features and advantages of the disclosed methods, devices, and/or systems are described in, and will be apparent from, the following Detailed Description and the Figures.

DETAILED DESCRIPTION

In contrast to single-user physical computing devices, virtualization environments include multiple Virtual Machines (VMs, also referred to as guests) that share underlying hardware with one another according to management provided by a hypervisor. One benefit of the virtualization environment is that the messages and packets are handled by the hypervisor programmatically, whereas the messages and packets handles in a physical computing device are electrical signals, which can be lost, dropped, or distorted. Accordingly, the processing protocols used by physical computing devices incorporate loss-recovery methods, whereas typical virtualization environments do not, as the programmatic messages and packets cannot be dropped or lost.

The present disclosure extends the protocols used in a virtualization environment to allow for a packet or message to be programmatically "dropped" from the host when the memory demands at the hypervisor exceed the initially planned-for memory demands without unexpectedly affecting the guest from which the message was initially received. When the host determines that the previously accepted message can no longer be held or executed by the host in the time or space initially expects, the host sends an indication back to the guest (which may include the message or a pointer thereto) The message (or a pointer thereto) that the guest is to maintain and resubmit the message when the host has the resources to handle the message. The guest, therefore, may maintain the message at no cost to the hypervisor until the host is able to handle the message, or the guest may drop the message based on locally determined priorities for messages.

Figure 1:
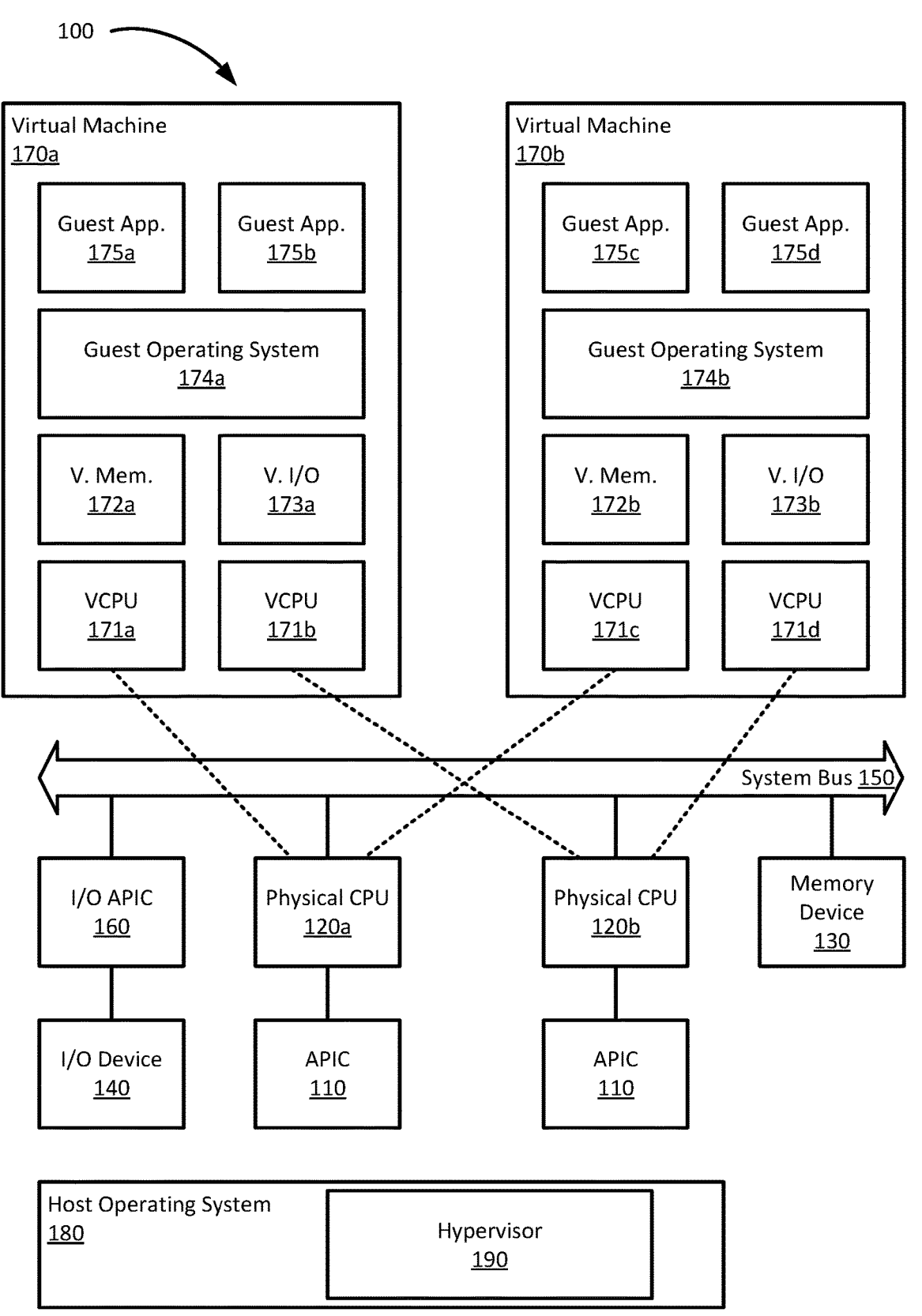
FIG. 1 illustrates a high-level component diagram of a computer system, according to examples of the present disclosure.

FIG. 1 illustrates a high-level component diagram of a computer system 100, according to examples of the present disclosure. The computer system 100 may include one or more physical central processing units (PCPUs) 120a-b (generally or collectively, processors or PCPUs 120) communicatively coupled to memory devices 130, and input/output (I/O) devices 140 via a system bus 150.

In various examples, the PCPUs 120 may include various devices that are capable of executing instructions encoding arithmetic, logical, or I/O operations. In an illustrative example, a PCPU 120 may follow Von Neumann architectural model and may include an arithmetic logic unit (ALU), a control unit, and a plurality of registers. In another aspect, a PCPU 120 may be a single core processor which is capable of executing one instruction at a time (or process a single pipeline of instructions), or a multi-core processor which may simultaneously execute multiple instructions. In another aspect, a PCPU 120 may be implemented as a single integrated circuit, two or more integrated circuits, or may be a component of a multi-chip module (e.g., in which individual microprocessor dies are included in a single integrated circuit package and hence share a single socket).

In various examples, the memory devices 130 include volatile or non-volatile memory devices, such as RAM, ROM, EEPROM, or any other devices capable of storing data. In various examples, the memory devices 130 may include on-chip memory for one or more of the PCPUs 120.

In various examples, the I/O devices 140 include devices providing an interface between a PCPU 120 and an external device capable of inputting and/or outputting binary data.

The computer system 100 may further comprise one or more Advanced Programmable Interrupt Controllers (APIC), including one local APIC 110 per PCPU 120 and one or more I/O APICs 160. The local APICs 110 may receive interrupts from local sources (including timer interrupts, internal error interrupts, performance monitoring counter interrupts, thermal sensor interrupts, and I/O devices 140 connected to the local interrupt pins of the PCPU 120 either directly or via an external interrupt controller) and externally connected I/O devices 140 (i.e., I/O devices connected to an I/O APIC 160), as well as inter-processor interrupts (IPIs).

In a virtualization environment, the computer system 100 may be a host system that runs one or more virtual machines (VMs) 170a-b (generally or collectively, VM 170), by executing a hypervisor 190, often referred to as "virtual machine manager," above the hardware and below the VMs 170, as schematically illustrated by FIG. 1. In one illustrative example, the hypervisor 190 may be a component of a host operating system 180 executed by the host computer system 100. Additionally or alternatively, the hypervisor 190 may be provided by an application running under the host operating system 180, or may run directly on the host computer system 100 without an operating system beneath it. The hypervisor 190 may represent the physical layer, including PCPUs 120, memory devices 130, and I/O devices 140, and present this representation to the VMs 170 as virtual devices.

Each VM 170a-b may execute a guest operating system (OS) 174a-b (generally or collectively, guest OS 174) which may use underlying VCPUs 171a-d (generally or collectively, VCPU 171), virtual memory 172a-b (generally or collectively, virtual memory 172), and virtual I/O devices 173a-b (generally or collectively, virtual I/O devices 173). A number of VCPUs 171 from different VMs 170 may be mapped to one PCPU 120 when overcommit is permitted in the virtualization environment. Additionally, each VM 170a-b may run one or more guest applications 175a-d (generally or collectively, guest applications 175) under the associated guest OS 174. The guest operating system 174 and guest applications 175 are collectively referred to herein as "guest software" for the corresponding VM 170.

In certain examples, processor virtualization may be implemented by the hypervisor 190 scheduling time slots on one or more PCPUs 120 for the various VCPUs 171a-d. In an illustrative example, the hypervisor 190 implements the first VCPU 171a as a first processing thread scheduled to run on the first PCPU 120a, and implements the second VCPU 171b as a second processing thread scheduled to run on the first PCPU 120a and the second PCPU 120b. When the hypervisor 190 allows a VM 170 to simultaneously run two or more VCPUs 171 on two or more PCPUs 120, that VM 170 may be referred to as an SMP VM 170. For example, when the processing threads of the first VCPU 171a and the second VCPU 171b are scheduled at overlapping times, the first VM 170a may be identified as an SMP VM 170.

Device virtualization may be implemented by intercepting virtual machine memory read/write and/or input/output (I/O) operations with respect to certain memory and/or I/O port ranges, and by routing hardware interrupts to a VM 170 associated with the corresponding virtual device. Memory virtualization may be implemented by a paging mechanism allocating the host RAM to virtual machine memory pages and swapping the memory pages to a backing storage when necessary.

Figure 2:
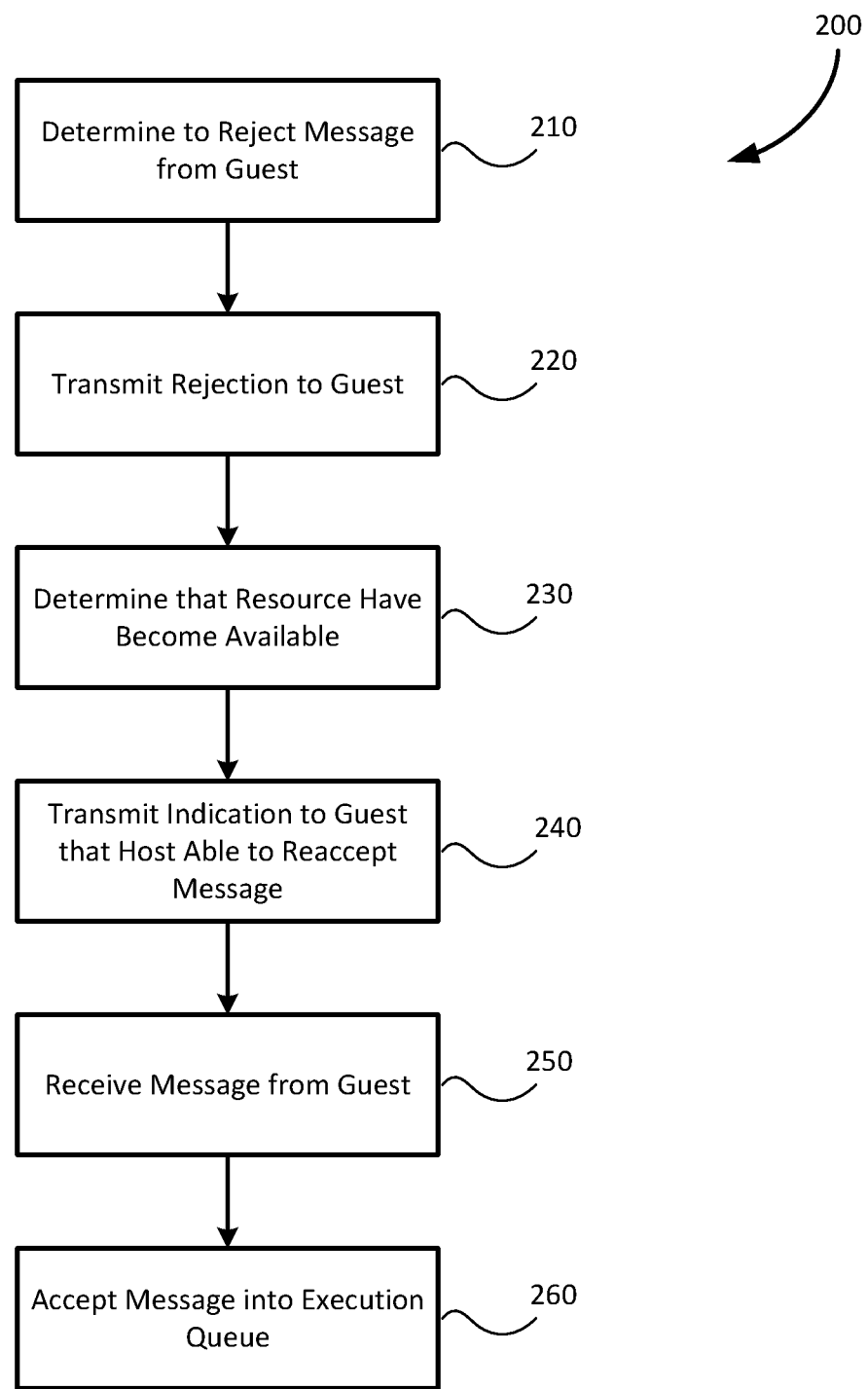
FIG. 2 is a flowchart from the perspective of a host performing operations according to the described protocol, according to examples of the present disclosure

FIG. 2 is a flowchart of a method 200 from the perspective of a host performing operations according to the described protocol, according to examples of the present disclosure. In various examples, method 200 may be performed in tandem with method 300 (discussed in relation to FIG. 3) within one distributed computing environment. As discussed herein, the message or packet is transmitted via a virtual socket between the guest and the host, and includes various instructions that request use of a processor managed by the host.

Method 200 begins a block 210, where the host determines to reject a message from a guest that the host previously accepted for processing. In various examples, the host determines to reject a previously accepted message when the message as received exceeds an expected size compared to when the host initially agreed to accept or advertised availability to accept the message (e.g., due to the message not being as compressible as expected), when the message as received occupies a greater space in memory than expected compared to when the host initially agreed to accept or advertised availability to accept the message (e.g., due to the message blocking other messages from sharing a page in memory), or the host reallocating resources among a plurality of guests (that includes the guest from which the message was received) to provide fewer or different resources to the guest than what was initially available to the guest.

At block 220, the host transmits a rejection to the guest from which the rejected message was received. In various examples, the rejection can include a copy of the message being rejected or a pointer to a copy of the message held by the guest. After transmitting the rejection, the host may then drop the message from the virtual memory of the host, thus freeing the memory resources to handle other messages from the guest or other guests served by the host.

At block 230, the host determines that resources have become available to handle the message previously rejected per block 210 and block 220. In various examples, in response to determining that resources to handle the message previously rejected by the host have become available for the guest, the host reserves those resources to re-receive the message from the guest, at least temporarily. In various examples, the host may wait to indicate the availability to receive any additional messages from the guest until suffi-cient resources to handle the rejected message have become available. For example, the host may normally indicate that resources are available to handle messages when at least X kilobytes (kB) are available in memory, but may accumulate and reserve resources to have at least Y kB of available memory (where Y>X) when the rejected message consumed Y kB of memory. However, because the guest independently controls which messages to transmit to the host, any resources reserved by the host may be used for different purposes than processing the initially rejected message according to the guest's determination, and the available resources may be used for handling different messages. In various examples, the host releases any reserved resources in response to at least one of: reaching a time-out threshold from when the indication was sent to the guest, receiving a threshold number of transmissions from the guest, or receiv-ing a threshold amount of data from the guest (across one or more messages).

At block 240, the host transmits an indication to the guest from which the rejected message was received that the resources have become available for host to reaccept the message. In various examples, the indication is intended to prompt the guest to retransmit the message initially rejected per block 210 and block 220, and may include the threshold criteria for how the host has reserved or accumulated any resources to handle the message.

At block 250, the host receives the message from the guest that was previously rejected per block 210 and block 220.

At block 260, the host accepts the message received per block 250 into an execution queue in a virtual memory of the host on behalf of the guest. The host may reject the message received per block 250 similarly to how the message was initially rejected per block 210 and block 220 based on changing memory conditions at the host, or may perform the instructions included in the message on behalf of the guest according to the execution queue.

Figure 3:
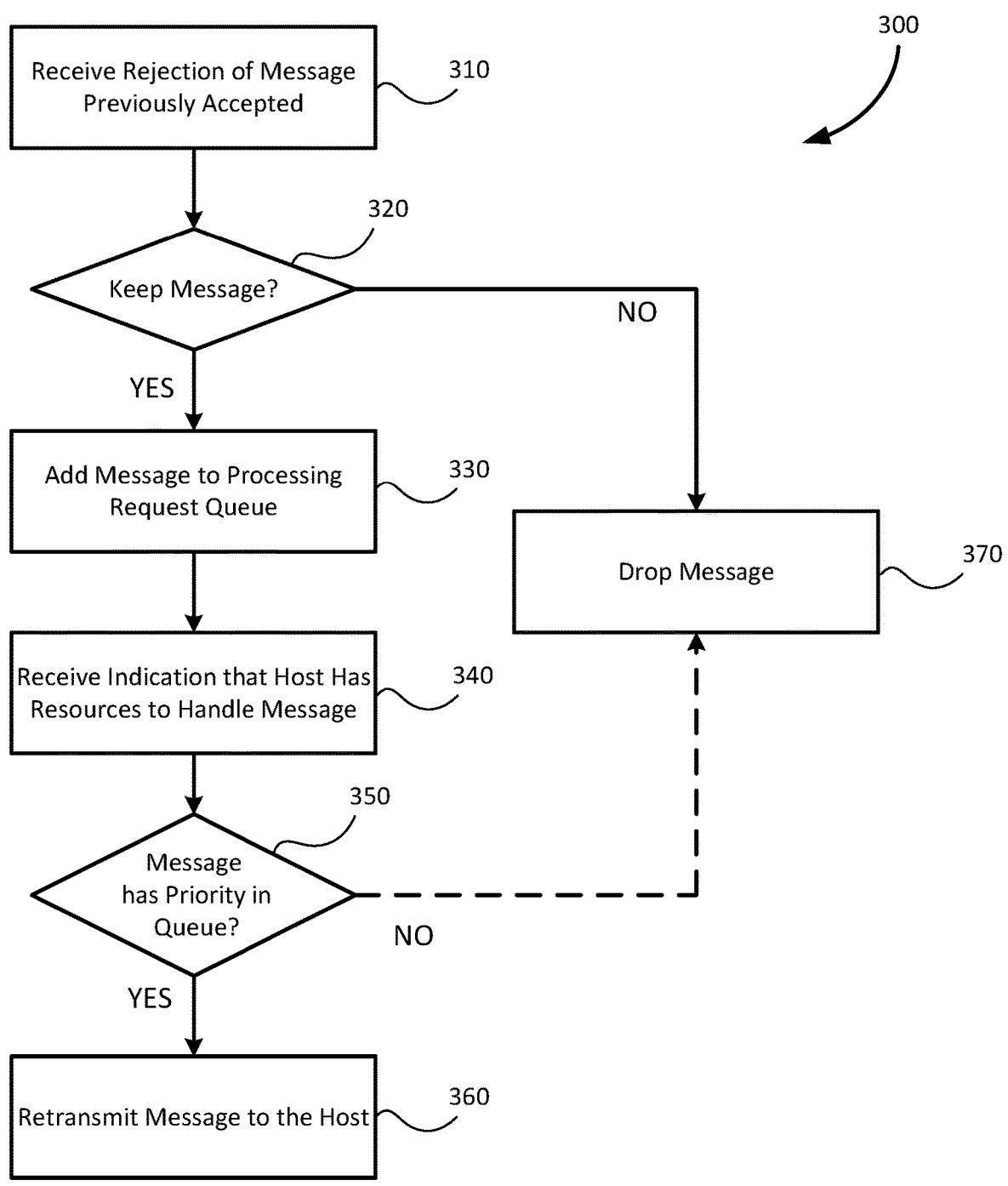
FIG. 3 is a flowchart from the perspective of a guest performing operations according to the described protocol, according to examples of the present disclosure

FIG. 3 is a flowchart of a method 300 from the perspective of a guest performing operations according to the described protocol, according to examples of the present disclosure. In various examples, method 300 may be performed in tandem with method 200 (discussed in relation to FIG. 2) within one distributed computing environment.

Method 300 begins at block 310, where a guest receives, from a host, a rejection of a message previously accepted by the host from the guest for processing. In various examples, the rejection may include a copy of the message from the host, or may include a pointer to a location in the guest memory to the message. In various examples, the guest may receive the rejection in response to the host determining that the message requires more resources than expected on initial acceptance of the message or the host reallocating resources among a plurality of guests that includes the guest (e.g., reassigning memory initially allocated to the guest to a new or higher-priority guest).

At block 320, the guest determines whether to keep the message and reattempt performance of the instructions included in the message or to drop the message. When the guest determines to keep the message, method 300 proceeds to block 330. When the guest determines to not keep (e.g., drop) the message, method 300 proceeds to block 370. In various examples, the guest may determine whether to keep or drop the message based on the priority of the message relative to other pending messages, a sensitivity of the instructions included in the message for performance in a certain order relative to instructions included in other messages, a size (and fullness) of the processing request queue held in the guest memory, and the like.

At block 330, the guest adds the message to a processing request queue on the guest. In various examples, the guest may add the message to the front of the processing queue, or may add the message to various other positions in the queue relative to other queued messages based on the relative priorities of the messages, sizes of the messages, and the like.

At block 340, the guest receives an indication from the host that the host has resources available to handle the message. In various examples, the indication includes infor-mation regarding the resources available on the host, includ-ing criteria under which the host has reserved any resources for use by the guest, including the amount of resources available on the host for the guest, how long such resources are available for, and any special conditions for accessing the resources.

At block 350, the guest determines, according to the processing request queue, whether to retransmit the previ-ously rejected message of a different message. When the guest determines to send a different message to use the resources available on the host before transmitting the previously rejected message (e.g., a second message with higher priority), the guest re-determines whether to keep the message in queue or drop the message. Accordingly, method 300 may remain at block 350 until sufficient resources are again available on the host to receive the previously rejected message, or proceed to block 370 to drop the message when the message has timed out on the guest or is otherwise no longer desired by the guest to be processed by the host.

At block 360, the guest retransmits the message to the host. The host, on receipt of the message, may process the message according to an execution queue in the host memory, including performing any instructions included in the message or rejecting the message again based on chang-ing memory conditions in the host memory and differences between expected and actual memory resources consumed by the message.

At block 370, the guest, in response to determining, by the guest, to not continue requesting the host to process the message (e.g., at block 320 or block 350), drops the message by either not adding the message to the processing request queue or removing the message from the processing request queue.

Figure 4:
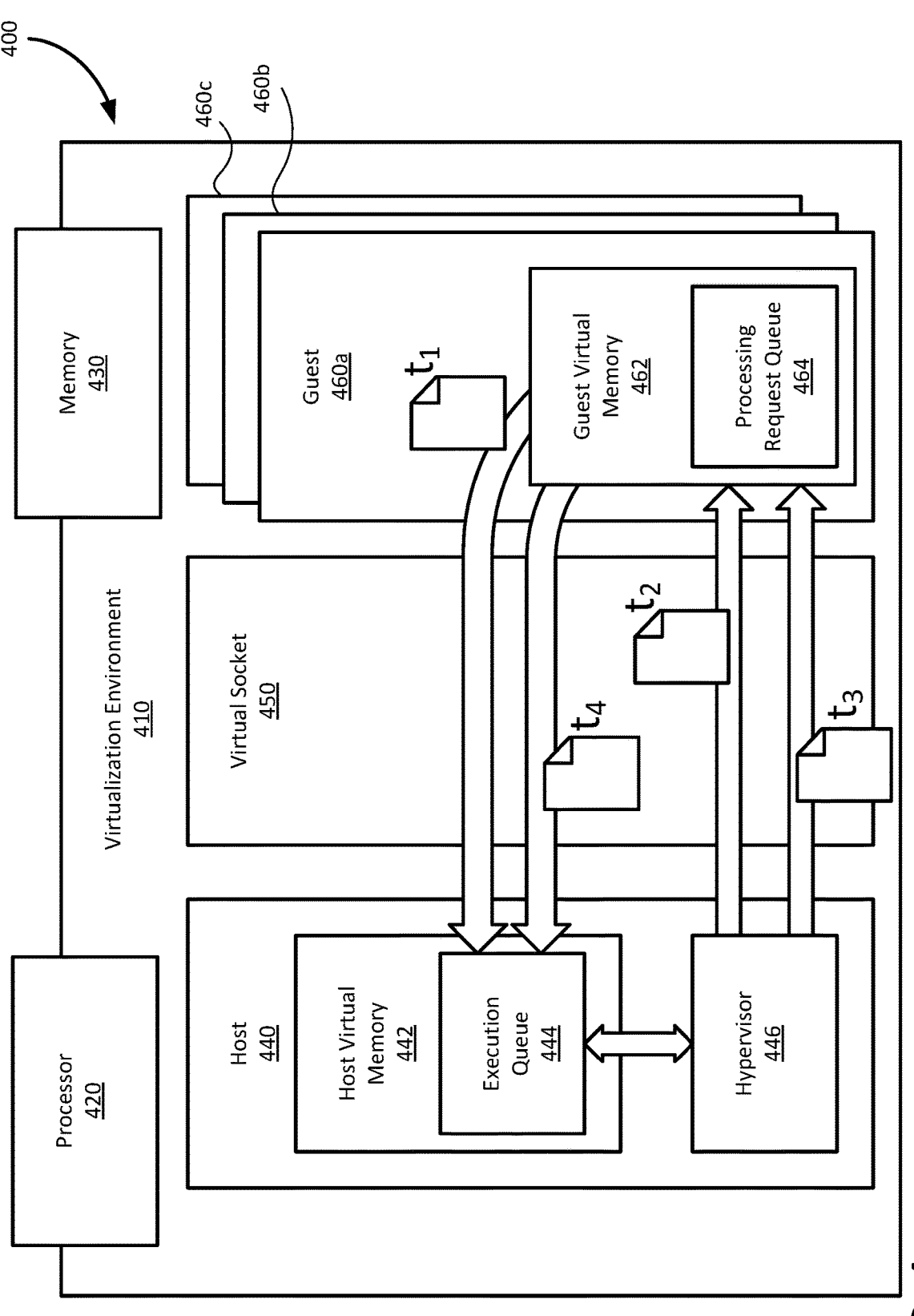
FIG. 4 is a block diagram of a system operating according to the described protocol, according to examples of the present disclosure.

FIG. 4 is a block diagram of a system 400 operating according to the described protocol, according to examples of the present disclosure. The system 400 includes (at least one) processor 420 and (at least one) memory 430. The memory 430 includes instructions that, when executed by the processor 420, provide a virtualization environment 410 including a host 440 and a plurality of guests 460a-c (generally or collectively, guest 460) which communicate with one another via a virtual socket 450. Although the illustrated example in FIG. 4 focuses on the communications between the host 440 and the first guest 460a (as a certain guest 460), the described behaviors may be extrapolated to any guest 460 and the host 440, and the behavior described in the present disclosure may be performed in parallel (and at various cadences or with different operations occurring at substantially the same time) between the host 440 and several guests 460. Additionally, although illustrated with three guests 460, the virtualization environment 410 may include more or fewer guests 460 in other examples.

Additionally, the example in FIG. 4 is discussed in relation to various times. In some examples, these times may be evenly spaced (e.g., $\Delta(t_x,t_{x+1})=\Delta(t_{x+1},t_{x+2})$) or unevenly spaced (e.g., where $\Delta(t_x, t_{x+1})$ does not necessarily equal $\Delta(t_{x+1}, t_{x+2})$) from one another as measured according to time (e.g., X milliseconds), clock cycles of the processor 420, or clock cycles of virtual processors for the host or the guests. Additionally, various actions may occur between the indicated times or the indicated times may be subsequent operations from the perspective or one or both or the host 440 and the guest 460. For example, a guest 460 may perform a first operation at time t1 and a second operation at time t2 with no intervening operations, while a host 440 may perform a first operation at time t1, a second operation at time t2, and several intervening operations (which may be part of different instances of the presently discussed process or of different processes) between time t1 and time t2. Therefore, the time markers discussed in the present disclosure should be understood as references to various times for performing elements of the presently discussed process, but are not limiting of the operations of the virtualization environment 410 in handling other processes in parallel or interspersed with the presently discussed process.

In the process illustrated in FIG. 4, the first guest 460a initially sends a message at time $t_1$, via the virtual socket 450, to the host 440 for addition to an execution queue 444 in the host virtual memory 442, which the hypervisor 446 initially accepts. However, the hypervisor 446 may determine that the message cannot be stored in the host virtual memory 442 after receipt due to a variety of circumstances. For example, the amount of memory allocated to the first guest 460a in the host virtual memory 442 may decrease due to another guest 460 gaining priority for a greater portion of the host virtual memory 442 or the number of guests 460 increasing, in which the hypervisor 446 reallocates a portion of the host virtual memory 442 initially available for the first guest 460a to use to one or more other guests 460. In another example, the hypervisor 446 may initially accept the message transmitted at time $t_1$ under an assumption regarding the size of the message, compressibility of the message, or ability for the message to slot into the available pages of the host virtual memory 442, but if the message is larger in size or otherwise takes up more space in the host virtual memory 442 than expected, the hypervisor 446 may reject the message.

After determining to reject the message transmitted at time $t_1$, the host 440 transmits, via the virtual socket 450, a rejection at time t2 to the first guest 460a. In various examples, the rejection may include a pointer to an instance of the message stored by the first guest 460a in a processing request queue 464 or may include a copy of the message for the first guest 460a to add back to the processing request queue 464 that is part of the guest virtual memory 462. The host 440 may then, in response to transmitting the rejection to the first guest 460a, drop the message from the host virtual memory 442 and free up memory resources for other messages from the first guest 460a or other guests 460 served by the host 440.

The first guest 460a, in response to receiving the rejection of the message previously sent at time $t_1$ and subsequently accepted by the host 440 for processing, determines whether to add the message back to the processing request queue 464, and how to organize/prioritize the message relative to other messages that the guest 460a has queued for processing. For example, the first guest 460a may add the message to the front of the queue to be re-transmitted to the host 440 as soon as available resources become available, or may place later-generated messages ahead of the message for processing before the message (e.g., interrupts or messages associated with higher-priority tasks by the first guest 460a).

In some examples, the first guest 460a may determine to drop the message from the queue, and not request the host to process the message even when resources to handle the message become available at the host 440.

The host 440, after transmitting the rejection at time t2, and in response to determining that resources to handle the message previously rejected by the host 440 have become available for the first guest 460a, transmits, via the virtual socket 450 at time t3, an indication to the first guest 460a that the host 440 is able to reaccept the message.

The first guest 460a after receiving the indication from the host 440 that resources to process the rejected message have become available determines whether to resend the message to the host 440. In various examples, when the first guest 460a determined to re-queue (e.g., not drop) the message, the first guest 460a then determines whether to send the message again or send a different message (e.g., an interrupt). When the first guest 460a determines to resend the message, the message is transmitted at time t4.

Because the first guest 460a determines how (and when or whether) to re-send the message to the host 440 for processing on behalf of the first guest 460a independently of the host 440, the host 440 may only make the resources available for a window of time. Accordingly, the host may reserve the resources for re-accepting the message and later release the reservation after a time-out threshold from when the indication was sent to the guest, the first guest 460a sends a threshold number of messages, or the first guest 460a sends messages that take a threshold amount of the host virtual memory 442. In various examples, the indication may include these timeout or memory space thresholds to inform the first guest 460a what conditions the host 440 has reserved the resources under.

The host 440, in response to receiving the message from the first guest 460a a subsequent time as transmitted at time t4, accepts the message in the execution queue 444 in the host virtual memory 442 on behalf of the first guest 460a. Although still subject to changes in memory allocation among guests 460 and the space consumed by any different messages that the first guest 460a sent between time $t_1$ and time t4, because the host 440 has previously seen the message (e.g., as transmitted at time $t_1$ and re-transmitted at time t4), the amount of space in the host virtual memory 442 that the message will actually consume is better known to the host 440, and the host 440 can make a more accurate estimate of how compressible the message is and how the message will fit in into the pages of the host virtual memory 442. Accordingly, the message transmitted at time t4 will likely be accepted and processed by the host 440, but may also be rejected, following the process outlined herein again for the host 440 to drop the message and allow the first guest 460a to resubmit the message at a later time for processing. Once the message is accepted and reaches the top of the execution queue 444, the host 440 then performs, on behalf of the first guest 460a, a processor 420 shared among a plurality of guests 460 served by the host 440 any instructions included in the message.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the examples described herein will be apparent to those skilled in the relevant art. Such changes and modifications can be made without departing from the spirit and scope of the present subject matter and without diminishing its intended advantages. It is therefore intended that such changes and modifications be covered by the appended claims.

What is claimed is:

1. A method, comprising:

providing, by a computing device, a virtualization environment including a host and a virtual machine, wherein the host and the virtual machine are located on the computing device;

transmitting, by the virtual machine of the virtualization environment, a message to the host of the virtualization environment via a virtual socket that is between the virtual machine and the host;

receiving, by the virtual machine and from the host of the virtualization environment, a rejection of the message previously accepted by the host of the virtualization environment, wherein the rejection is received in response to the host determining that the message requires more resources than expected on initial acceptance of the message or the rejection is received in response to the host reallocating resources among a plurality of guests that includes the virtual machine;

in response to receiving the rejection of the message, adding, by the virtual machine of the virtualization environment, the message to a processing request queue on the virtual machine;

receiving, by the virtual machine of the virtualization environment, an indication from the host of the virtualization environment that the host has resources available to handle the message; and in response to receiving the indication from the host of the virtualization environment, retransmitting, by the virtual machine of the virtualization environment, the message to the host of the virtualization environment via the virtual socket according to the processing request queue.

2. The method of claim 1, wherein the message requests use of the virtual socket managed by the host for use by the plurality of guests that includes the virtual machine.

3. The method of claim 1, wherein the rejection includes a pointer to an instance of the message stored by the virtual machine.

4. The method of claim 1, wherein the rejection includes a copy of the message.

5. The method of claim 1, further comprising:

in response to receiving, at the virtual machine from the host, a second rejection of a second message previously accepted by the host from the virtual machine for processing, determining, by the virtual machine, whether to continue requesting the host to process the second message; and in response to determining, by the virtual machine, not to continue requesting the host to process the second message, dropping the second message from the processing request queue.

6. A method, comprising:

providing, by a computing device, a virtualization environment including a host and a virtual machine, wherein the host and the virtual machine are located on the computing device; receiving, by the host of the virtualization environment, a message from the virtual machine via a virtual socket that is between the virtual machine and the host;

accepting, by the host of the virtualization environment, the message from the virtual machine for processing;

determining, by the host of the virtualization environment, to reject the message previously accepted from the virtual machine, wherein the host determines to reject the message in response to determining that the message requires more resources than expected on initial acceptance of the message or in response to the host reallocating resources among a plurality of guests that includes the virtual machine;

in response to determining to reject the message, transmitting, by the host of the virtualization environment, a rejection to the virtual machine;

after transmitting the rejection, determining, by the host of the virtualization environment, that resources to handle the message have become available for the virtual machine;

in response to determining that the resources to handle the message have become available for the virtual machine, transmitting, by the host of the virtualization environment, an indication to the virtual machine that the host is able to reaccept the message;

after transmitting the indication to the virtual machine, receiving, by the host of the virtualization environment, the message from the virtual machine a second time via the virtual socket; and in response to receiving the message from the virtual machine the second time, accepting, by the host of the virtualization environment, the message in an execution queue in a virtual memory of the host on behalf of the virtual machine.

7. The method of claim 6, wherein the rejection includes a pointer to an instance of the message stored by the virtual machine.

8. The method of claim 6, wherein the rejection includes a copy of the message.

9. The method of claim 6, further comprising:

dropping the message from the virtual memory of the host in response to transmitting the rejection to the virtual machine.

10. The method of claim 6, further comprising:

performing, on behalf of the virtual machine, and by the host on a processor shared among the plurality of guests that include the virtual machine, instructions included in the message according to the execution queue.

11. The method of claim 6, further comprising, in response to determining that resources to handle the message previously rejected by the host have become available for the virtual machine:

reserving the resources by the host for the virtual machine to receive the message; and releasing the resources from reserve in response to at least one of:

reaching a time-out threshold from when the indication was sent to the virtual machine; and receiving a threshold number of transmissions from the virtual machine that do not include the message.

12. The method of claim 6, wherein the host determines to reject the message based on the host determining that the message exceeds an expected size compared to when the host accepted the message or that the message occupies a greater space in memory than expected compared to when the host accepted the message.

13. A computing device, comprising:

a processor; and a memory including instructions that when executed by the processor provide a host configured to manage resources in the computing device among a plurality of guests via operations including:

providing a virtualization environment that includes the host and a virtual machine, the virtual machine being one of the plurality of guests, wherein the host and the virtual machine are located on the computing device;

receiving, by the host of the virtualization environment, a message from the virtual machine via a virtual socket that is between the virtual machine and the host; accepting, by the host of the virtualization environment, the message from the virtual machine for processing;

determining, by the host of the virtualization environment, to reject the message previously accepted from the virtual machine, wherein the host determines to reject the message in response to determining that the message requires more resources than expected on initial acceptance of the message or in response to the host reallocating the resources among the plurality of guests that includes the virtual machine;

in response to determining to reject the message, transmitting, by the host of the virtualization environment, a rejection to the virtual machine;

after transmitting the rejection, determining, by the host of the virtualization environment, that resources to handle the message have become available for the virtual machine;

in response to determining that the resources to handle the message have become available for the virtual machine, transmitting, by the host of the virtualization environment, an indication to the virtual machine that the host is able to reaccept the message;

after transmitting the indication to the virtual machine, receiving, by the host of the virtualization environment, the message from the virtual machine a second time via the virtual socket; and in response to receiving the message from the virtual machine the second time, accepting, by the host of the virtualization environment, the message in an execution queue in a virtual memory of the host on behalf of the virtual machine.

14. The computing device of claim 13, wherein the rejection includes one of a pointer to an instance of the message stored by the virtual machine or a copy of the message.

15. The computing device of claim 13, wherein the operations further comprise:

dropping the message from the virtual memory of the host in response to transmitting the rejection to the virtual machine.

16. The computing device of claim 13, wherein the operations further comprise:

performing, on behalf of the virtual machine, and by the host on the processor which is shared among the plurality of guests, instructions included in the message according to the execution queue.

17. The computing device of claim 13, wherein the operations further comprise, in response to determining that resources to handle the message previously rejected by the host have become available for the virtual machine:

reserving the resources by the host for the virtual machine to receive the message; and releasing the resources from reserve in response to at least one of:

reaching a time-out threshold from when the indication was sent to the virtual machine; and receiving a threshold number of transmissions from the virtual machine that do not include the message.

18. The computing device of claim 13, wherein the host determines to reject the message based on the host reallocating the resources among the plurality of guests to provide fewer or different resources to the virtual machine.

* * * * *